Figure 1:
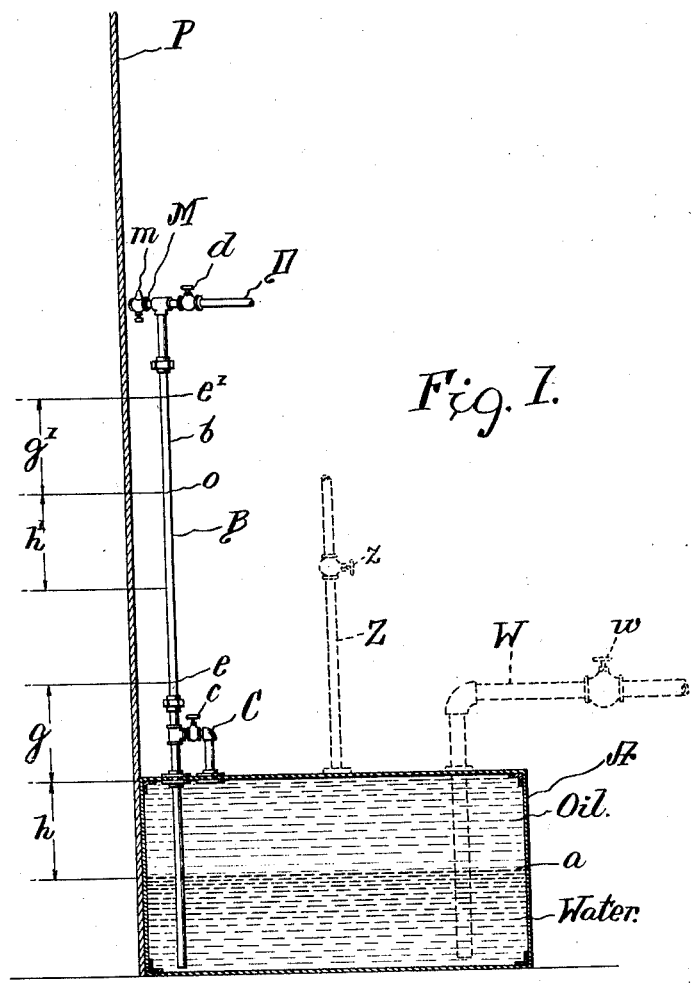

R. G. THOMAS.
METHOD OF AND APPARATUS FOR MEASURING THE HEIGHTS OF SUPERPOSED LIQUIDS OF VARYING SPECIFIC GRAVITIES.
APPLICATION FILED JUNE 11, 1919.

1,329,150.

Patented Jan. 27, 1920.

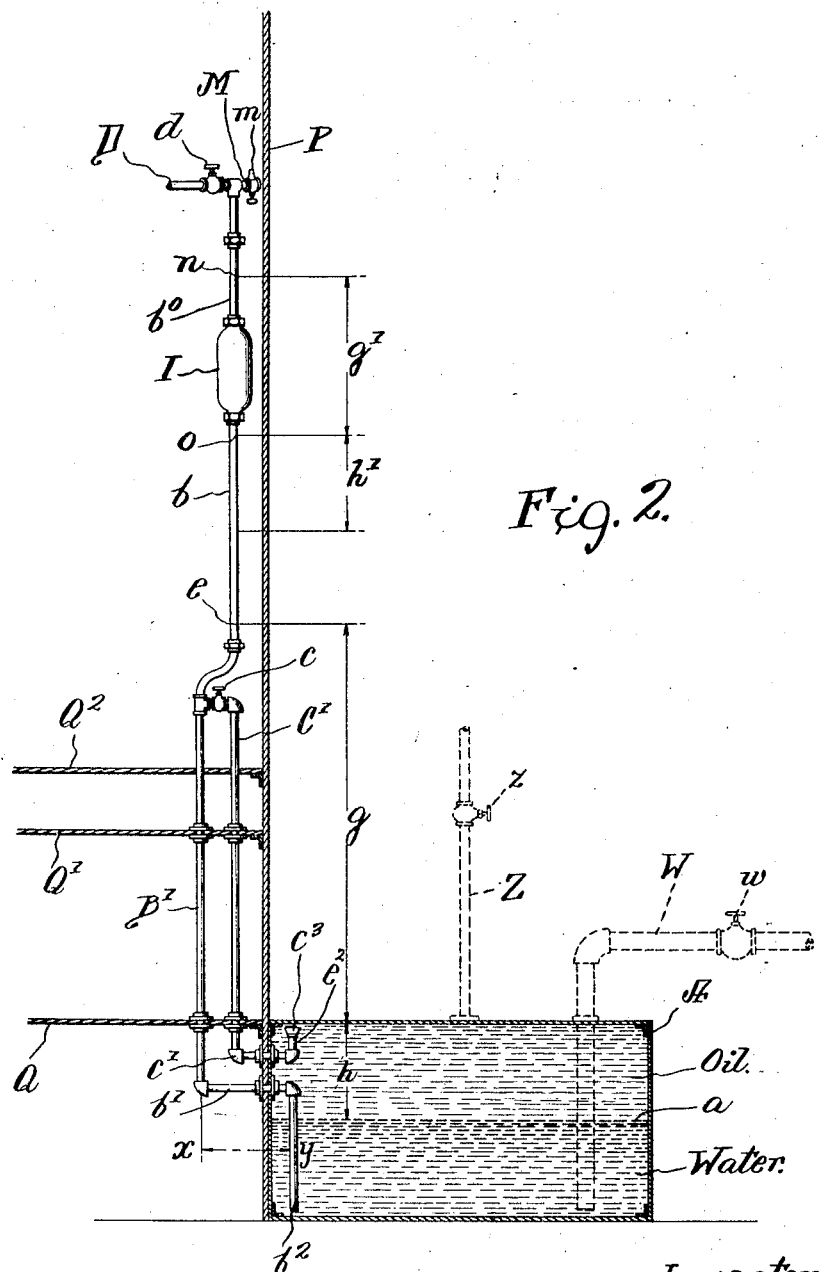

UNITED STATES PATENT OFFICE.

RAYMOND GAUDENZ THOMAS, OF MONTICELLO, IOWA.

METHOD OF AND APPARATUS FOR MEASURING THE HEIGHTS OF SUPERPOSED LIQUIDS OF VARYING SPECIFIC GRAVITIES.

1,329,150.          Specification of Letters Patent.     Patented Jan. 27, 1920.

Application filed June 11, 1919. Serial No. 303,408.

*To all whom it may concern:*

Be it known that I, RAYMOND GAUDENZ THOMAS, a citizen of the United States, residing at Monticello, in the county of Jones and State of Iowa, have invented certain new and useful Improvements in Method of and Apparatus for Measuring the Heights of Superposed Liquids of Varying Specific Gravities; and I do hereby declare the following to be a full, clear, and exact description of the invention, such as will enable others skilled in the art to which it appertains to make and use the same.

My invention relates to improvements in method of and apparatus for measuring the heights of superposed liquids of varying specific gravities, where it is impossible or impracticable to secure direct access to the receptacles containing the liquids, and where it is desired to ascertain the relative heights of the liquid in the receptacle by the inspection of gages located at a distance.

My invention is especially adapted for use as a measuring gage for tanks containing fuel oil and using water compensation, such as are found on submarines, or it may be employed on navel vessels using fuel oil; but the invention is also applicable to various other uses for determining the relative heights of two or more strata of superposed liquids of different specific gravities contained in a common receptacle.

My invention will be more fully understood after reference to the accompanying drawings, in which like parts are indicated by similar reference symbols throughout the several views, and in which:—

Figure 1 is a diagrammatic view showing a simple form of invention, with a straight standpipe for use in determining the relative height of water and oil in a tank filled with the two liquids; and Fig. 2 is a similar view to Fig. 1, with the parts arranged for measuring from a distance, such as from the other side of a bulkhead, and several decks or floors above the receptacle in which the liquids are contained.

Referring first to Fig. 1, A represents a fuel tank which is intended to be originally filled with oil, through the oil pipe Z controlled by the valve $z$, which pipe also supplies the engine with oil through a connection not shown.

Water is pumped in below through the water supply pipe W controlled by the valve $w$, as the oil is drawn off, whereby the tank is kept full of liquid. The connections for supplying water and oil, or for drawing off same, are well known in the art, and do not constitute a part of my invention, and for purposes of clearness in the drawings are shown only diagrammatically and in dotted lines.

B represents a standpipe connected by the branch pipe C to the top of the tank, which branch pipe C serves as an equalizer, as will be hereinafter described, and is controlled by the valve $c$.

D represents a pipe connected to a source of pneumatic pressure, preferably low air pressure, and controlled by the valve $d$, preferably a needle valve. This pipe D is connected to the top of the standpipe B, and opposite the pipe D is a vent pipe M closed by the vent cock $m$. The standpipe B has a gage glass $b$, with its zero point at $o$, and the gage is also provided with the reference mark $e$ at a known height $g$ above the inner surface of the top of the tank.

$a$ represents the water level beneath the oil and $h$ represents a variable quantity, that is the depth of oil that is in the tank which it is desired to measure.

Above the zero point $o$ of the gage $b$ I provide the reference mark $e'$, whose distance $g'$ from the point $o$ is equal to the length $g$.

P represents a bulkhead.

The cross section of the standpipe throughout as well as of the gage glass should be preferably uniform so as to insure the simplest form of apparatus; but the cross section may be varied as will be hereinafter referred to in connection with Fig. 2.

The operation of the apparatus shown in Fig. 1 is as follows:—

Assuming that the fuel tank has been operating long enough to bring the water level in the fuel tank to any level, such as $a$, and assuming that the valves of the measuring device are closed, and the standpipe and gage glass contain fuel oil to some height above the reference mark $e$, to measure the height of fuel in the tank proceed as follows:

(1) Open the equalizing valve $c$ which will connect the standpipe B with the top of the fuel tank A by way of the equalizing pipe C. This will cause any water that may be pushed up into the standpipe B to settle down to the level $a$, and there will be no water in the standpipe above this level, but the standpipe will then be partly filled with oil, owing to the pressure in the system.

(2) After the water has attained its static balance, open the air valve $d$ and blow the oil in the gage glass down to the mark $e$. Oil is blown in against the hydraulic pressure already existing in the tank. The additional liquid so introduced will be a very small amount and will be taken care of by the yielding of the imprisoned air found in the tank, or in the pipe lines, or in the compression chambers of the pumps; or the same may be positively disposed of by forcing the liquid back against the pressure in the pipe W, or any other suitable way of permitting the insertion of a small amount of additional liquid in the tank may be adopted. Such means are found in the use of such apparatus aboard ship, and are no part of my present invention. With the equalizing valve $c$ open, the contents of the standpipe B and the equalizing pipe C will come to static balance.

(3) Close the equalizing valve $c$.

(4) Open the vent $m$ on the standpipe and permit the tank pressure to force the oil and water in the standpipe B into the gage glass until the top of the oil column reaches the upper measuring mark $e'$. The oil column represented by $g$ and $h$ has now been transferred so that the top of the oil column is at $e'$, and since the height $g'$ is equal to the height $g$, therefore, as there has been no change in the volume of the oil, the height $h'$ must equal the height $h$, and thus by reading on the gage glass the distance $h'$, we will know the height of the oil in the tank A.

(5) Opening the equalizing valve $c$ permits the water to drain back into the fuel tank until the level of the water in the standpipe will be the same as the level $a$ in the tank A.

Where it is desired to measure the height of the oil in the fuel tanks at a distance, it might be necessary to make the oil gage too long for practical purposes, and therefore instead of having the standpipe of uniform cross section throughout, a portion of the standpipe may be enlarged to provide a reservoir. Moreover, when the fuel tank top is not directly accessible, a change in the leads of the standpipe may be necessary or desirable.

Such changes are shown in Fig. 2, which embodies the same principle as is illustrated in Fig. 1, except that I provide a reservoir I in the standpipe, and the standpipe and equalizing pipe have additional bends than are shown in Fig. 1.

Referring to Fig. 2, the construction of the tank A as shown is similiar to that already shown in Fig. 1, but the standpipe B' has an elbow $b'$ which projects into the side of the tank A, with a vertical leg $b^2$ which dips down into the tank and opens near the bottom thereof. The equalizing pipe C' is also provided with an elbow $c'$, and with an upwardly projecting arm $c^2$ having an inlet opening $c^3$ close to the top of the tank.

These two pipes B' and C' may pass through a number of superposed decks or horizontal bulkheads, such as indicated at Q, Q' and Q².

Furthermore in this form of device I provide not only the gage glass $b$ below the reservoir I, but an additional gage glass above the reservoir I. The capacity of this reservoir I, including that of the gage glasses between the reference marks $n$ and $o$, is made just equal to the capacity of the standpipe between the reference marks $e$ and $e^2$, and also includes the capacity of the horizontal pipe $b'$ between the marks $x$ and $y$. The mark $e^2$ corresponds to the underside of the top of the tank A.

The operation of the device shown in Fig. 2 is as follows:—

(1) Open the equalizing pipe C. This permits the height of the water in the standpipe to drop to the level $a$ of the water in the fuel oil tank.

(2) Open the air valve $d$ and blow the oil down to the mark $e$ on the lower gage glass $b$.

(3) Close the equalizing valve $c$.

(4) Open the vent $m$ and permit the tank pressure to force the oil in the standpipe B to the mark $n$ on the upper gage glass $b^0$. The number of inches of oil below the mark $o$ on the lower gage will be equal to the number of inches of oil in the fuel tank, that is $h$ equals $h'$.

(5) Opening the equalizing valve $c$ permits the water in the standpipe to drain back into the fuel tank, and the height of water in the standpipe is automatically adjusted to the height of the water in the fuel tank.

(6) In actual practice the standpipe should always enter the fuel tank as near the top as possible, because when the height of the water reaches the height of the horizontal pipe $b'$, the readings taken cease to be accurate.

For a similar reason, when the oil is nearly driven out of the tank by the pressure of the water from beneath, it would tend to flow into the equalizing pipe C' unless the inlet of this pipe was very near the undersurface of the top of the tank.

While I have shown the invention as applied to a specific purpose, to wit, the measuring visually of the relative depths of oil and water in a submarine fuel tank, to which purpose the invention is especially applicable; it will be obvious that the same idea may be applied to the relative heights of any number of superposed layers of liquids, having different specific gravities, contained in a single tank, well, or other receptacle, wherein pressure is applied to the lower liquid stratum, causing the lower and heavier liquid to force up sections of the lighter superimposed strata, the depth of each stratum so forced up being indicated in the column so raised.

It will be obvious that various modifications in the herein described device, and in the construction, combination and arrangement of parts might be made which could be used without departing from the spirit of my invention; and I do not mean to limit the invention to such details except as particularly pointed out in the claims.

Having thus described my invention what I claim and desire to secure by Letters Patent of the United States is:—

1. Apparatus of the character described comprising a closed receptacle for containing a plurality of strata of liquids of varying specific gravities under pressure therein, a stand pipe projecting down into said receptacle and provided with a gage glass at a distance above said receptacle, an equalizing branch pipe connecting said stand pipe with the upper interior portion of said receptacle, a valve controlling said equalizing pipe, and means for applying pneumatic pressure to the top of said stand pipe and means for releasing said pneumatic pressure when desired, substantially as described.

2. Apparatus of the character described comprising a closed receptacle for containing a plurality of strata of liquids of varying specific gravities under pressure therein, a stand pipe projecting down into said receptacle and provided with a gage glass at a distance above said receptacle, a reservoir chamber included in the upper portion of said stand pipe to receive a predetermined amount of the liquid forced from said receptacle into said stand pipe, an equalizing branch pipe connecting said stand pipe with the upper interior portion of said receptacle, a valve controlling said equalizing pipe, and means for applying pneumatic pressure to the top of said stand pipe and means for releasing said pneumatic pressure when desired, substantially as described.

3. Apparatus of the character described comprising a closed receptacle for containing a plurality of strata of liquids of varying specific gravities under pressure therein, a stand pipe projecting down into said receptacle and provided with a gage glass at a distance above said receptacle, an equalizing branch pipe connecting said stand pipe with the upper interior portion of said receptacle, a valve controlling said equalizing pipe, a pipe for conveying air pressure and opening into the top of said stand pipe, a valve for controlling said air pressure, and a vent cock for relieving said air pressure when desired, substantially as described.

4. Apparatus of the character described comprising a closed receptacle for containing a plurality of strata of liquids of varying specific gravities under pressure therein, a stand pipe projecting down into said receptacle and provided with a gage glass portion at a distance above said receptacle, said portion including a reservoir chamber to receive a predetermined amount of the liquid forced from said receptacle into said stand pipe, an equalizing branch pipe connecting said stand pipe with the upper interior portion of said receptacle, a valve controlling said equalizing pipe, a pipe for conveying air pressure and opening into the top of said stand pipe, a valve for controlling said air pressure, and a vent cock for relieving said air pressure when desired, substantially as described.

5. The method of measuring the relative depths of superposed strata of liquids of different densities filling a closed receptacle having a stand pipe extending upwardly therefrom and normally opening into a lower stratum only, but having a valve controlled branch opening into a higher stratum, the upper section of said pipe being transparent, said method consisting in opening the valve in the branch pipe to cause the lower stratum of liquid to assume the same level in the stand pipe as in said receptacle, and then closing said valve and changing the relative pressures on the liquid in said pipe and in the tank so as to cause the liquid of the lower stratum to move upward in the pipe, floating above it the lighter liquid and causing the same to move into said transparent section and thus indicate visually the depth of the upper stratum in the receptacle, substantially as described.

RAYMOND GAUDENZ THOMAS.